United States Patent
Blom

(10) Patent No.: US 8,168,278 B2
(45) Date of Patent: May 1, 2012

(54) PLASTIC TUBE FOR USE IN AUTOMOTIVE AIR BRAKE SYSTEMS

(75) Inventor: Dirk Gijsbert Blom, Sittard (NL)

(73) Assignee: DSM IP Assets B.V., Heerlen (NL)

( * ) Notice: Subject to any disclaimer, the term of this patent is extended or adjusted under 35 U.S.C. 154(b) by 412 days.

(21) Appl. No.: 12/528,900

(22) PCT Filed: Mar. 10, 2008

(86) PCT No.: PCT/EP2008/001893
§ 371 (c)(1),
(2), (4) Date: Aug. 27, 2009

(87) PCT Pub. No.: WO2008/110326
PCT Pub. Date: Sep. 18, 2008

(65) Prior Publication Data
US 2010/0104790 A1    Apr. 29, 2010

(30) Foreign Application Priority Data
Mar. 13, 2007  (EP) .................................... 07005093

(51) Int. Cl.
*B29D 22/00* (2006.01)
*B29D 23/00* (2006.01)
*B32B 1/08* (2006.01)

(52) U.S. Cl. .................. 428/36.91; 428/36.9; 428/35.7; 428/220; 428/474.4; 428/480

(58) Field of Classification Search ................. 428/36.9, 428/36.91, 35.7, 220, 474.4, 480; 192/221, 192/225
See application file for complete search history.

(56) References Cited

FOREIGN PATENT DOCUMENTS
WO    2004/048086    6/2004

OTHER PUBLICATIONS

International Search Report for PCT/EP2008/001893, mailed Jun. 30, 2008.
Database WPI Week 199420, Derwent Publications Ltd., London, GB; AN 1994-164026, XP002447875.

*Primary Examiner* — Michael C Miggins
(74) *Attorney, Agent, or Firm* — Nixon & Vanderhye P.C.

(57) ABSTRACT

The invention relates to a multilayered plastic tube for use in automotive airbrake systems comprising an outer layer and an inner layer, and optionally at least one intermediate layer positioned between the inner and outer layer, wherein at least one layer of the inner layer and the optional intermediate layer or layers consists of a thermoplastic polymer composition having a flexural modulus in the range of 1000-2300 MPa and comprising a semicrystalline polyamide and/or polyester polymer having a melting temperature of at least 1800 C., and wherein the outer layer and any other remaining layer consist of a copolyester elastomer composition and/or copolyamide elastomer composition.

15 Claims, No Drawings

PLASTIC TUBE FOR USE IN AUTOMOTIVE AIR BRAKE SYSTEMS

This application is the U.S. national phase of International Application No. PCT/EP2008/001893, filed 10 Mar. 2008, which designated the U.S. and claims priority to Europe Application No. 07005093.5, filed 13 Mar. 2007, the entire contents of each of which are hereby incorporated by reference.

The invention relates to a plastic tube for use in automotive air brake systems. Particular requirements for such tubes are described in ISO 7628-2, which relates to thermoplastics tubing for air braking systems, mounting on vehicles and test methods. ISO 7628-2 specifies the minimum requirements for tubing used in air braking systems, to allow its marking in accordance with ISO 7628-1. The marking of the tubing does not automatically imply that the tube assembly (i.e. tube with end-fittings) is appropriate to its use on a vehicle.

These tubes must be thermoformable meanwhile rigid enough to be preshaped and at the same time be flexible enough for mounting purposes, as well as impact resistant, in particular at low temperature. The tubes must also be resistant against oil, environmental stress cracking for example due to ozone and chemicals, and in particular be resistant against elevated temperatures and elevated pressures, i.e. the tubes must have high burst pressures at elevated temperature. The tubings defined in ISO 7628-2 belong to two possible categories:

tubing for use up to a maximum working pressure of 10 bar (or 1000 kPa)

tubing for use up to a maximum working pressure of 12.5 bar (or 1250 kPa) and within a temperature range of -40° C. to +100° C.

The burst pressures which the tubes must be able to withstand during test cycles are typically much higher than the maximum working pressure.

Such tubes are known from U.S. Pat. No. 5,032,633. The known tubes are made of PA12 compositions. The tubes used at the moment are made of PA12 or PA 11 compositions plasticized with around 10 wt. % plasticizer. The plasticizer is needed to impart sufficient flexibility and impact resistance at low temperature.

Due to more compactness of automotive car engines the temperature under the bonnet under running conditions attain higher values and also higher air brake pressures are applied in the newer air-brake systems. For example for trucks, the latest requirements prescribe tests performed at 125° C.

A problem with the tubes made from the plasticized PA12 or PA 11 compositions is too low a burst pressure at high temperature. As a consequence there is a need for air brake tubes that have a higher burst pressure resistance and a better high temperature resistance. Using a polyamide with a higher melting temperature provides insufficient impact resistance at low temperature unless an increased amount of plasticizer is used which sets off other properties. Integration of a heat shield in the car engine to protect the air brake tubing might be an alternative solution, which however is not always possible and also raises costs.

JP 06 107804 addresses the problem of inadequate burst pressure resistance through providing a braid splicing yarn in an intermediate or outer layer of a multi-layered tube comprising a thermoplastic elastomer composition. However, this solution is complex and costly and typically leads to a reduction in stretchability of the tube.

A further aspect is that plastic tubes for use in automotive air brake systems come in various diameters and wall thickness. In general the larger the diameter the larger the wall thickness needed to attain the required burst pressure. A problem related to that is that increase of wall thickness is limited for low diameter tubes, and thereby the increase in burst pressure resistance is limited as well, whereas an increase in wall thickness for large diameter tubes generally results in reduction of the flexibility and thermoformability.

The aim of the present invention is therefore to provide a plastic tube that has a better burst pressure performance at elevated temperatures compared to the tubes made from the plasticized PA12 or PA 11 compositions, i.e. higher burst pressure resistance at elevated temperature. Meanwhile the tubes must retain other good properties like flexibility and impact resistance at low temperatures, be thermoformable and stretchable.

This aim has been achieved with the multilayered plastic tube according to the invention, comprising an outer layer and an inner layer, and optionally at least one intermediate layer positioned between the inner and outer layer, wherein at least one layer of the inner layer and the optional intermediate layer or layers consists of a thermoplastic polymer composition having a flexural modulus in the range of 1000-2300 MPa and comprising a semicrystalline polyamide and/or polyester polymer having a melting temperature of at least 180° C., and wherein the outer layer, and optionally another layer, consists of a elastomer composition comprising a copolyester elastomer and/or copolyamide elastomer.

The effect of the plastic tube according to the invention comprising the multilayered structure comprising the outer layer and optionally another layer consisting of an elastomer composition and an the inner and/or intermediate layer or layers consisting of a thermoplastic polymer composition as described above is that the plastic tube has an improved burst pressure resistance at elevated temperature with retention of other properties such as flexibility, thermoformability, and low temperature impact, whereas these properties are retained with tubes with small and large diameters, while the wall thickness of these tubes can be kept limited. The effect of the plastic tube according to the invention is such that the burst pressure performance thereof is better than of the PA12 tubes. The combination of properties of the plastic tube according to the invention is also better than that of for example plastic tubes consisting of a thermoplastic polymer composition having a flexural modulus in the range of 1000-2300 MPa, multilayered plastic tubes consisting of layers of different elastomer compositions, and multilayered plastic tubes comprising a layer consisting of a thermoplastic polymer composition having a flexural modulus above 2300 MPa. These plastic tubes suffer in at least one property compared to the plastic tube according to the invention.

For the sake of clarity it is indicated that with the term "multilayered plastic tube" is herein understood a plastic tube comprising at least two layers, i.e. a outer layer and an inner layer. Next to the outer layer and the inner layer, such multilayered plastic tube optionally comprises at least one intermediate layer. The optionally at least one intermediate layer is positioned between the inner and outer layer.

In the multilayered plastic tube according to the invention, the outer layer consists of an elastomer composition comprising a copolyester elastomer and/or copolyamide elastomer. Furthermore, at least one layer of the inner layer and the optional intermediate layer or layers consists of the said thermoplastic polymer composition. Further, the multilayered plastic tube may comprise another layer or other layers, different from the outer layer, also consisting of an elastomer composition. This can be the case when the multilayered plastic tube comprises at least three layers including at least one intermediate layer. This other layer thus can be the inner layer as well as an intermediate layer. The other layer is in that case one or more of the inner layer and the optional intermediate layer or layers not consisting of the said thermoplastic polymer composition.

The thermoplastic polymer composition in the multilayered plastic tube according to the invention has a flexural modulus in the range of 1000-2300 MPa.

Preferably, the flexural modulus of the thermoplastic polymer composition is in the range of 1200-2000 MPa, more preferably 1400-1800 MPa at 25° C. The advantage of the of the thermoplastic polymer composition having a flexural modulus in the restricted ranges is that the tube has an even better balance in burst pressure resistance at elevated temperature and flexibility at low temperature. The modification of the flexural modulus of a thermoplastic polymer composition may be obtained through a variety of conventional techniques known to the person skilled in the art, such as the addition of impact modifiers to the polymer composition or the modification of the polymer through the copolymerisation or the adjustment of the proportion of crystalline (hard block) and non-crystalline (soft block) components, when the thermoplastic polymer composition is a thermoplastic elastomer.

Preferably, the outer layer in the multilayered plastic tube according to the invention consists of an elastomer composition having a flexural modulus of at most 1000 MPa, preferably at most 800 MPa, 600 MPa, or even at most 500 MPa. Preferably, the flexural modulus of the outer layer is lower than the flexural moduluar of the inner and/or intermediate layer or layers consisting of the thermoplastic polymer composition. Preferably the difference in flexural modulus between the outer layer and the layer or layers consisting of the thermoplastic polymer composition is at least 100 MPa, more preferably at least 250 MPa and even more preferably at least 500 Mpa. The advantage of the outer layer consisting of an elastomer composition having a lower flexural modulus than that of the thermoplastic polymer composition is that the flexibility of the plastic tube is further increased while the good burst pressure at elevated temperature is retained at least so in large extent.

The copolyester and/or copolyamide elastomer composition in the outer layer preferably comprises a copolyester elastomer, such as a copolyether ester elastomer, a copolyester ester elastomer, and/or a copolycarbonate ester elastomer, and/or a mixture or copolymer thereof. More preferably, the copolyester elastomer is a copolyether ester elastomer comprising soft blocks derived from polytetramethyleneglycol or a copolycarbonate ester elastomer comprising polycarbonate soft blocks. The advantage of these preferred elastomers, and in particular the copolycarbonate ester elastomer comprised by the outer layer is that the ozone resistance of the multilayered tube is further enhanced.

Suitably, the multilayered plastic tube according to the invention comprises at least three layers, preferably including, next to the outer layer, another layer consisting of an elastomer composition comprising a copolyester elastomer and/or copolyamide elastomer. Preferably, the elastomer composition comprised by the said other layer has a flexural modulus of at most 1500 MPa, more preferably in the range of 300-1250 MPa, and still more preferably in the range of 500-1000 MPa. The advantage of the elastomer composition comprised by the other layer having a lower flexural modulus is that the plastic tube has a better flexibility, combined with a good retention of the burst pressure resistance at elevated temperature.

In the multilayered plastic tube according to the invention, the hardness of the layer or layers consisting of a copolyester elastomer composition and/or copolyamide elastomer composition may vary over a wide range. Suitably, the said hardness is in the range of 40-90 ShoreD preferably 50-80 ShoreD.

Preferably, the hardness of the outer layer is equal to or lower than the hardness of the other layer consisting of copolyester elastomer composition and/or copolyamide elastomer composition, preferably the outer layer has a hardness in the range of 40-70 Shore D and the other layer has a hardness in the range of 60-90 Shore D. The lower hardness material used for outer layer provides a better impact performance, and though typically more expensive in combination with the thermoplastic polymer interlayer allows for a thinner outer layer.

The elastomer composition may comprise, next to the copolyester elastomer and/or copolyamide elastomer, one or more additives. The additives comprised by the thermoplastic polymer composition may be any additive that is suitable for use in tubes based on elastomer compositions. More particular, the additive or additives contribute the strength and/or flexibility thereof, or that contributes to another property thereof and does not detract or in significant extent form the strength and/or flexibility thereof. Suitably, the additive is at least one of the following additives: stabilizers, colorants, processing aids. Suitable stabilizers include UV stabilizers, heat stabilizers, anti-oxidants and anti-ozonants. Examples of suitable processing aids are lubricants and release agents.

Preferably, the elastomer composition comprises next to the copolyester elastomer and/or copolyamide elastomer, at least one additive in a total amount of 0.1-30 wt. %, more preferably 0.2-20 wt. %, still more preferably 0.3-10 wt. %, relative to the total weight of the elastomer composition.

In the multilayered plastic tube comprising at least three layers, the layer consisting of the thermoplastic polymer composition preferably is an intermediate layer. The advantage of this tube construction is that the flexibility of the plastic tube is even further increased while the good burst pressure at elevated temperature is retained by large.

The thermoplastic polymer composition in the multilayered plastic tube comprises a semicrystalline polyamide and/or polyester polymer having a melting temperature of at least 180° C.

Preferably, the thermoplastic polymer composition comprises a semicrystalline polyester polymer and the elastomer composition in the outer layer and optional other layer or layers comprises a copolyester elastomer, or alternatively the thermoplastic polymer composition comprises a semicrystalline polyamide polymer and the elastomer composition in the outer layer and optional other layer or layers comprises a copolyamide elastomer.

The semicrystalline polyester polymer may be any semicrystalline polyester polymer having a melting temperature of at least 180° C. Analogously, the semicrystalline polyamide polymer may be any semicrystalline polyamide polymer having a melting temperature of at least 180° C.

Preferably, the thermoplastic polymer composition comprises a semicrystalline polyester polymer. Suitable semicrystalline polyester polymers are, for example, PBT, PET, PTT, PBN, PTN, and PEN, and copolymers thereof. Preferably, the semicrystalline polyester polymer comprises PBT.

The thermoplastic polymer composition may comprise, next to the semicrystalline polymer, one or more additives. The additives comprised by the thermoplastic polymer composition may be any additive that is suitable for use in thermoplastic polymer compositions that contribute the strength and/or flexibility thereof, or that contributes to another property thereof and does not detract or in significant extent form the strength and/or flexibility thereof. Suitable, the additive is at least one of the following additives: stabilizers, colorants, processing aids. Suitable stabilizers include UV stabilizers, heat stabilizers, anti-oxidants and anti-ozonants. Examples of suitable processing aids are lubricants and release agents.

Suitably, the thermoplastic polymer composition is an impact modified polymer composition and comprises, next to the semicrystalline polyamide or polyester polymer, an impact modifier. Suitably, the impact modifier is chosen from the group consisting of rubbers, plastomers and elastomer. Examples of suitable rubbers are polybutadiene rubbers, styrene butadiene rubbers, such as SBS and SEBS, EPDM rubbers and acrylic rubbers including core shell acrylics. Examples of plastomers are grafted polyolefines. Examples of suitable elastomers are polyetherester blockcopolymers. Preferably, the impact modifier is an elastomer. The advantage of using an elastomer as the impact modifier is that the composition will have a wider temperature range in which the flexural modulus is within the required operational limits, thereby minimizing the potential of system failure.

In a preferred embodiment, the thermoplastic polymer composition is an impact modified polyester composition comprising a semicrystalline polyester chosen from the group consisting of PBT, PET, PTT, PBN, PTN, and PEN, and an impact modifier.

The additive or additives in the thermoplastic polymer composition comprising the semicrystalline polymer may be present in a total amount varying over a large range. The amounts suitable for thermoplastic polymer composition used in the multilayer tube can be determined by the person skilled in the art of making plastics for plastic tubes by routine experiments and testing.

The amount of impact modifier will be determined by the target flexural modulus within the scope of the invention. Preferably, the thermoplastic polymer composition comprises an impact modifier in an amount of 0.5-30 wt. %, preferably 5-25 wt. %, and optionally one or more other additives in a total amount of 0.1-25, preferably 0.5-20 wt. %, relative to the total weight of the thermoplastic polyester composition. In alternative embodiments, an impact modifier of less than 10 wt. %, relative to the total weight of the thermoplastic polyester composition, is required to achieve the target flexural modulus.

The diameter of the multilayered plastic tube according to the invention and the thickness of the various layers therein may vary over a large range. Preferably, the tube has an outer diameter in the range of 4-25 mm, more preferably 5-20 mm, or even 8-15 mm, and a wall thickness in the range of 0.8-2.5 mm, more preferably 1-2.2 mm, or even 1.2-2.0 mm. Also preferably, the layer consisting of the thermoplastic polyester composition has a thickness in the range of 20-75%, more preferably 25-60%, relative to the wall thickness of the tube. Preferably, the multilayered plastic tube is thermoformable, thereby avoiding further processing steps such as required for the addition of a braided layer.

In a preferred embodiment of the invention the multilayered plastic tube is a 3-layered tube comprising a inner layer (I) consisting of a copolyester and/or copolyamide elastomer composition having a hardness in the range of 60-90 Shore D, an intermediate (or central) layer (C) consisting of a thermoplastic polyester composition having a flexural modulus in the range of 1000-2000 MPa at 25° C., and an outer layer (O) consisting of a copolyester and/or copolyamide elastomer composition having a hardness in the range of 40-70 Shore D. Preferably, the thickness of layer I is 10-45%, more preferably 20-40%, the thickness of layer C is 20-60%, more preferably 25-50%, or even 30-40%, and the thickness of layer 0 is 10-45%, more preferably 20-40%, wherein the percentages are relative to the wall thickness of the tube.

The invention also relates to the use of the multilayered plastic tube according to the invention an automotive air brake system.

The invention also relates to the use of the multilayered plastic tube according to the invention in hydraulic fluid lines.

The invention also relates to an automotive air brake system comprising a multilayered plastic tube according to the invention.

The invention is further illustrated with the following examples and comparative experiments.

Materials
PA12: Plasticized PA12, standard grade for tube preparation.
TPE-A: Polyether ester elastomer having a flexural modulus of 360 MPa.
TPE-B: Polyether ester elastomer having a flexural modulus of 900 MPa.
PBT-A: Unmodified PBT having a flexural modulus of 2500 MPa.
PBT-B: modified PBT comprising rubber impact modifier having a flexural modulus of 1600 MPa.

Tube Production by Extrusion Molding

The above materials were used in standard extrusion molding equipment for making tubes with different structures, being either monolayer, double layer or triple layer tubes. The tubes had an inner diameter of 9 mm, an outer diameter of 12 mm and a wall thickness of 1.5 mm. Data on the structures of the tubes, and the composition and thickness of the individual layers have been collected in Table 1.

Test Methods

Burst pressure was measured ISO 7628 at a modified temperature of 125° C.

Cold impact was measured according to ISO 7628.

Thermoformability was measured by deforming the tubes at room temperature around a mandrel, keep stress on the deformed tubes, and let relaxate the tubes at elevated temperature.

Flexibility was measured by bending the tubes by hand.

The results of the test methods for the tubes of Examples I-II and Comparative Experiments A-E have been collected in Table 1.

TABLE 1

Structure and composition of multilayered tubes according to Comparative Experiments A-E and Examples I-II, and test results thereof.

|  | CE-A | CE-B | CE-C | CE-D | CE-E | EX-I | EX-II |
|---|---|---|---|---|---|---|---|
| Outer layer | PA12 | TPE-A | TPE-A | TPE-A | PBT-B | TPE-A | TPE-A |
|  | 1.5 mm | 0.5 mm | 1.3 mm | 0.75 mm | 1.5 | 0.5 mm | 0.5 |
| Intermediate layer |  |  |  |  |  | TPE-B | PBT-B |
|  |  |  |  |  |  | 0.5 mm | 0.5 |
| Inner layer |  | PBT-A | PBT-A | TPE-B |  | PBT-B | TPE-B |
|  |  | 1.0 mm | 0.2 mm | 0.75 mm |  | 0.5 mm | 0.5 mm |

TABLE 1-continued

Structure and composition of multilayered tubes according to Comparative Experiments A-E and Examples I-II, and test results thereof.

|  | CE-A | CE-B | CE-C | CE-D | CE-E | EX-I | EX-II |
|---|---|---|---|---|---|---|---|
| Burst pressure at elevated temp. | Not OK | OK | Not OK | Not OK | OK | OK | OK |
| Thermoformability | OK | Not OK | OK | OK | Not OK | OK | OK |
| Flexibility | OK | Not OK | OK | OK | Not OK | OK | OK |
| Cold impact | OK | Not OK | OK | OK | Not OK | OK | OK |

The invention claimed is:

1. Plastic tube for use in automotive airbrake systems characterized in that plastic tube is a multilayered plastic tube comprising an outer layer and an inner layer, and optionally at least one intermediate layer positioned between the inner and outer layer, wherein at least one layer of the inner layer and the optional intermediate layer or layers consists of a thermoplastic polymer composition having a flexural modulus in the range of 1000-2300 MPa at 25° C. and comprising a semicrystalline polyamide and/or polyester polymer having a melting temperature of at least 180° C., and wherein the outer layer and any other remaining layer consist of a copolyester elastomer composition and/or copolyamide elastomer composition.

2. Multilayered plastic tube according to claim 1, wherein the thermoplastic polymer composition has a flexural modulus in the range of 1200-2000 MPa at 25° C.

3. Multilayered plastic tube according to claim 1, wherein the outer layer consists of a copolyester elastomer composition and/or copolyamide elastomer composition having a flexural modulus of at most 1000 MPa at 25° C.

4. Multilayered plastic tube according to claim 1, wherein the difference in the flexural modulus between the thermoplastic polymer composition layer and the outer layer is at least 1000 Mpa at 25° C.

5. Multilayered plastic tube according to claim 1, wherein the copolyester and/or copolyamide elastomer composition comprises a copolyester elastomer, preferably a copolyether ester elastomer comprising soft blocks derived from polytetramethyleneglycol.

6. Multilayered plastic tube according to claim 1, wherein the hardness of the layer or layers consisting of a copolyester elastomer composition and/or copolyamide elastomer composition is in the range of 40-90 ShoreD.

7. Multilayered plastic tube according to claim 1, wherein the layer consisting of a thermoplastic polymer composition is an intermediate layer.

8. Use of a multilayered plastic tube according to claim 1, in an automotive air brake system.

9. Air brake system comprising a multilayered plastic tube according to claim 1.

10. Multilayered plastic tube according to claim 1, wherein the multilayered plastic tube comprises at least 3 layers including an inner layer and/or an intermediate layer consisting of a copolyester elastomer composition and/or copolyamide elastomer composition having a flexural modulus of at most 1500 MPa at 25° C.

11. Multilayered plastic tube according to claim 10, wherein the hardness of the outer layer is equal to or lower than the hardness of the other layer consisting of copolyester elastomer composition and/or copolyamide elastomer composition, preferably the outer layer has a hardness in the range of 40-70 Shore D and the other layer has a hardness in the range of 60-90 Shore D.

12. Multilayered plastic tube according to claim 1, wherein the thermoplastic polymer composition is an impact modified polyester composition comprising a semicrystalline polyester and an impact modifier.

13. Multilayered plastic tube according to claim 12, wherein the impact modifier is selected from a group consisting of rubbers, plastomers or elastomers.

14. Multilayered plastic tube according to claim 12, wherein the impact modifier is an elastomer.

15. Multilayered plastic tube according to claim 12, wherein the impact modifier is an elastomer, wherein the thermoplastic polymer composition comprises an impact modifier in an amount of 0.5-30 wt. %.

* * * * *